United States Patent [19]

Kennedy et al.

[11] 4,429,099

[45] Jan. 31, 1984

[54] PHENOL TERMINATED POLYMERS AND EPOXIES THEREFROM

[75] Inventors: Joseph P. Kennedy; Suhas Guhaniyogi, both of Akron, Ohio

[73] Assignee: The University of Akron, Akron, Ohio

[21] Appl. No.: 443,346

[22] Filed: Nov. 22, 1982

[51] Int. Cl.³ .................. C08G 59/24; C08G 59/32; C08F 8/08
[52] U.S. Cl. .......................... 528/98; 525/333.7; 525/359.2; 525/384; 528/121; 528/123; 549/560; 568/718; 568/720
[58] Field of Search ............ 525/333.7, 359.2, 384; 528/98, 121, 123; 549/560; 568/718, 720

[56] References Cited

U.S. PATENT DOCUMENTS

| | | | |
|---|---|---|---|
| 3,060,140 | 10/1962 | Greenlee | 528/98 X |
| 3,309,339 | 3/1967 | Barton et al. | 528/98 |
| 3,370,038 | 2/1968 | Barton et al. | 528/98 |
| 4,316,973 | 2/1982 | Kennedy | 525/333.7 |

Primary Examiner—Earl A. Nielsen
Attorney, Agent, or Firm—Oldham, Oldham, Hudak, Weber & Sand Co.

[57] ABSTRACT

The invention sets forth novel telechelic (terminally functional) prepolymers which may be reacted to form curable epoxies. On account of the incorporation of saturated elastomer chains into the prepolymers improved epoxies arise having increased moisture resistance and less brittleness than conventional epoxies. These prepolymers may be straight chain or three-armed star, emanating from a common phenyl ring nucleus. Molecular weights of the prepolymers range from about 700 to 50,000 (linear) and from about 1000 to about 75,000 (three-arm star). The epoxies are useful as coatings, in adhesives, as additives, and the like.

10 Claims, 6 Drawing Figures

$^1$H NMR SPECTRA OF EPICHLOROHYDRIN AND GLY-CIDYL ETHER DERIVATIVE OF TRISPHENOL—PIB PLUS EPICHLOROHYDRIN.

FIG. 6

PHENOL TERMINATED POLYMERS AND EPOXIES THEREFROM

TECHNICAL FIELD

Invention herein lies in the art of low molecular weight, saturated polymers. Specifically, the field of the invention encompasses phenol terminated polyisobutylenes which can be further reacted to produce amine curable epoxy resins.

BACKGROUND ART

The present invention discloses phenol terminated saturated prepolymers and their reactions to produce cyclic ethers suitable for use as epoxy cements. Heretofore, saturated polymers such as polyisobutylenes have been prepared having various functional terminal groups. For example, U.S. Pat. No. 4,316,973 describes the preparation of hydroxyl terminated polyisobutylene (PIB) from the same polymer carrying a terminal unsaturation, which in turn is derived from tertiary halogen-terminated PIB. A process is utilized comprising dehydrohalogenation followed by hydroboration and oxidation. The polymer may be straight chained or multi-armed with a phenyl ring nucleus.

U.S. Pat. No. 4,327,201 teaches a method and production of macromolecular monomers from cationically polymerisable monomers and vinyl-substituted hydrocarbon halides. Other prior art patents dealing with the reaction of polyisobutylene include U.S. Pat. Nos. 4,276,394 and 3,994,993. None of the above patents however teach the production of phenol terminated PIB or their conversion to epoxy cements.

DISCLOSURE OF INVENTION

It is an aspect of the invention to provide, as well as a process for making, a saturated polymer having phenolic terminal groups.

It is another aspect of the invention to provide, as well as a process for making, a phenol terminated polymer, as above, which may be linear or multi-armed having a phenyl ring nucleus.

It is yet another aspect of the invention to provide, as well as a process for making, a phenol terminated polymer, as above, which can be prepared by quantitative Friedel-Crafts alkylation.

It is still another aspect of the invention to provide, as well as a process for making, a phenol terminated polymer, as above, which can be reacted with cyclic ethers to produce an epoxy cement.

It is yet another aspect of the invention to provide, as well as a process for making, an epoxy cement, as above, which can be cured with amines.

It is still another aspect of the invention to provide, as well as a process for making, an epoxy cement, as above, which has a high degree of flexibility after cure.

It is yet another aspect of the invention, to provide, as well as a process for making, an epoxy cement, as above, which is moisture resistant.

It is still another aspect of the invention to provide, as well as a process for making, an epoxy cement, as above, which is resistant to heat and ultraviolet light.

Yet another aspect of the invention is to provide, as well as a process for making, an epoxy cement, as above, which may be used as a coating.

These and other aspects of the invention which will become more apparent as the detailed description proceeds, are achieved by:

a telechelic prepolymer, comprising:

where n is 2 or 3 and Y is wherein $R_1$ and $R_2$ may be the same or different and are selected from the group consisting of —H, —OH and —$CH_3$ and x is a positive integer from about 2 to 700.

A telechelic epoxy prepolymer, comprising:

wherein n is 2 or 3 and Z is wherein $R_1$ and $R_2$ may be the same or different and are selected from the group consisting of —H, —OH, and —$CH_3$ and x is a positive integer from about 2 to about 700.

BRIEF DESCRIPTION OF DRAWINGS

For a fuller understanding of the objectives, techniques, and structure of the invention, reference should be made to the following detailed description and the drawings, wherein.

BEST MODE FOR CARRYING OUT THE INVENTION

The low molecular weight phenol terminated polymers or prepolymers of the invention are similar in structure to Bisphenol A and shall henceforth be termed Bisphenol PIB or Trisphenol PIB depending on whether the polyisobutylene backbone is linear or has a third arm emanating from the central phenyl ring, the latter also known as third arm star. Bisphenol and Trisphenol PIB's are prepared from the corresponding telechelic, that is terminally functional, polyisobutylene linear or three arm star polymers where the terminal groups are tertiary halogen or olefinic:

wherein $R_1$ and $R_2$ are selected from the group consisting of —H, —OH and —CH$_3$ and wherein x is an integer between 2 and 700. The F.C. acid is selected from the group consisting of AlCl$_3$, AlBr$_3$, BF$_3$, BF$_3$O(C$_2$H$_5$)$_2$, TiCl$_4$, SnCl$_4$, AlC$_2$H$_5$Cl$_2$, FeCl$_3$, SbCl$_5$, and SbF$_5$. The phenolic PIB structures thus have the following general formulas where $R_1$ and $R_2$ may be the same or different and are defined above:

Generally, if the three-arm star polymer is produced the pendant groups are meta to each other, i.e. n=3.

Thus, for example the phenolic starting material may be phenol, catechol, the various isomers of cresol, and the like. Preferred are phenol, resorcinol, phloroglucinol (1,3,5 trihydroxybenzene) and 1,3-dimethyl-2-hydroxybenzene. Most preferred is unsubstituted phenol.

The polyisobutylene starting materials may be produced by a technique described in U.S. Pat. No. 4,316,973 issued Feb. 23, 1982 to a coinventor of this invention and which is hereby incorporated by reference. The molecular weight of phenol-telechelic PIB's depend on the PIB chain lengths, that is the value of x. In general, the molecular weight ranges from about 700 to about 50,000 for Bisphenol PIB and about 50% higher for Trisphenol PIB, that is from about 1000 to 75,000. Because of this wide range of molecular weights the terms polymer and prepolymer will be used interchangably, but refer to the same materials. As indicated, the synthesis involves Friedel-Crafts alkylation as demonstrated in the example below.

Figure 1:
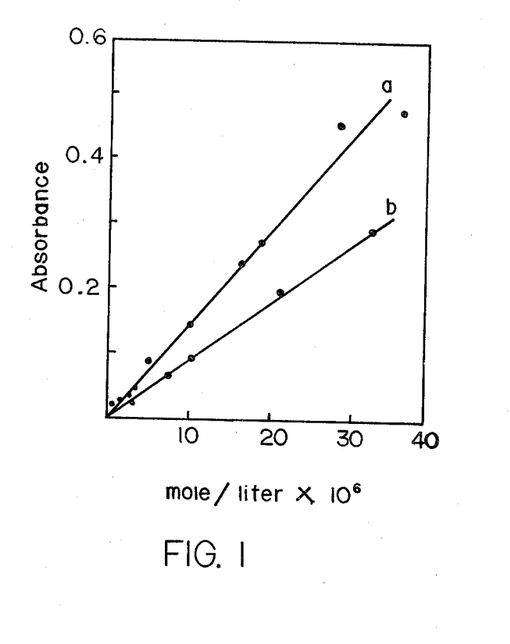
FIG. 1 consists of calibration curves for compounds used in the invention.

In order to obtain high quality networks for engineering materials from telechelic oligomers, the number of functional end groups in the prepolymers must be close to theoretical, that is, close to 100% of the terminal groups must consist of a phenolic moiety. The end group concentration of Bisphenol and Trisphenol PIB may be routinely determined by UV spectroscopy combined with molecular weight measurement using vapor pressure or membrane osmometry. FIG. 1 shows the calibration curves used for UV spectroscopy at 210 NM. For calibration purposes, the Bisphenol and Trisphenol PIB's were simulated by stoichiometric mixtures of 2,4,2-trimethyl-2-(hydroxyphenyl)-pentane or TMHPP and tert-chlorine-telechelic PIB (Cl$^t$-PIB-Cl$^t$):

The extinction coefficients $\epsilon$ of TMHPP and Cl$^t$-PIB-Cl$^t$ were 14,100 and 9,600 l/mol. cm., respectively, in cyclohexane. The overall error of end group determination was 5 to 10%.

In order to establish a base line, experimental techniques for producing the Bisphenol and Trisphenol PIB's model experiments were first devised utilizing 2,4,4-trimethyl-1-pentene (TMP) and 2-chloro-2,4,4-trimethylpentane (CTMP). These compounds correspond to olefin-telechelic PIB and chlorine-telechelic PIB, respectively. As described in example 1 below, phenol was alkylated by TMP and CTMP in the presence of various Friedel-Crafts acids. As can be seen with reference to Table 1, the model experiments yielded phenol functionality of exactly 1.00, that is, 100% alkylation could be achieved using both models.

Figure 2:
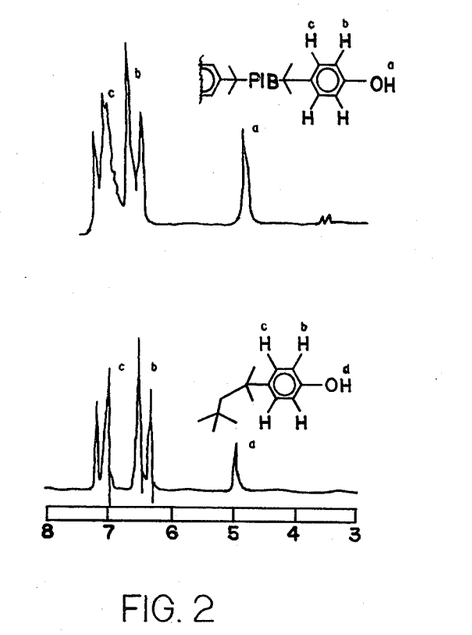
FIG. 2 consists of NMR spectra of various compounds in the invention.
Figure 3:
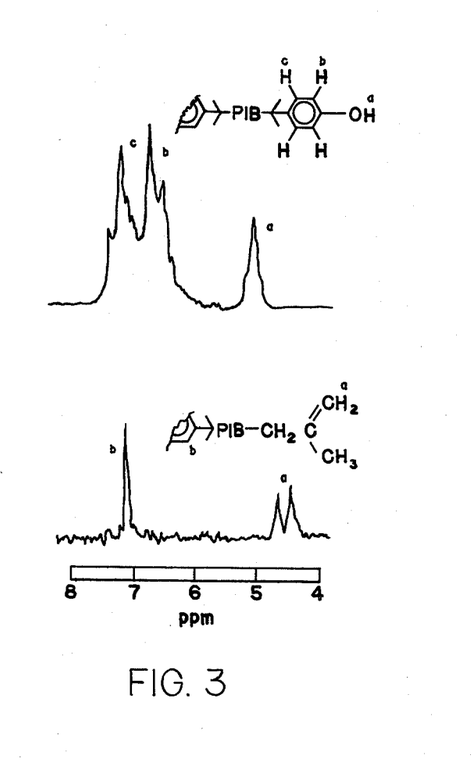
FIG. 3 consists of NMR spectra of polyisobutylenes.

In similar fashion, phenol was alkylated by olefin and chlorine telechelic PIB's. FIGS. 2 and 3 show the $^1$H NMR spectra of the model compound TMHPP, Bisphenol PIB, olefin telechelic PIB and Trisphenol PIB. The key resonances at 5.02, 6.72 and 7.20 ppm appearing in the model compound are associated with the protons of the —OH group, and of the ortho and meta positions to it, respectively. These resonances are also present in the phenol capped polymers at 5.08, 6.70 and 7.17 ppm, indicating the presence of phenol end groups in the latter.

Comparison of $^1$H NMR spectra of the authentic compounds 4-tert-butyl phenol and 2-tert-butyl phenol with the model compound TMHPP on the one hand and Bisphenol PIB on the other hand suggests that alkylation of phenol occurred exclusively in the para position.

The number of phenol termini, $\overline{F}_n$ in Bisphenol PIB and Trisphenol PIB was determined by UV spectroscopy combined with molecular weight determination. According to the data collected in Table 1, Bisphenol PIB and Trisphenol PIB contain 2.0 and 3.0 phenol end groups, within experimental error.

Figure 4:
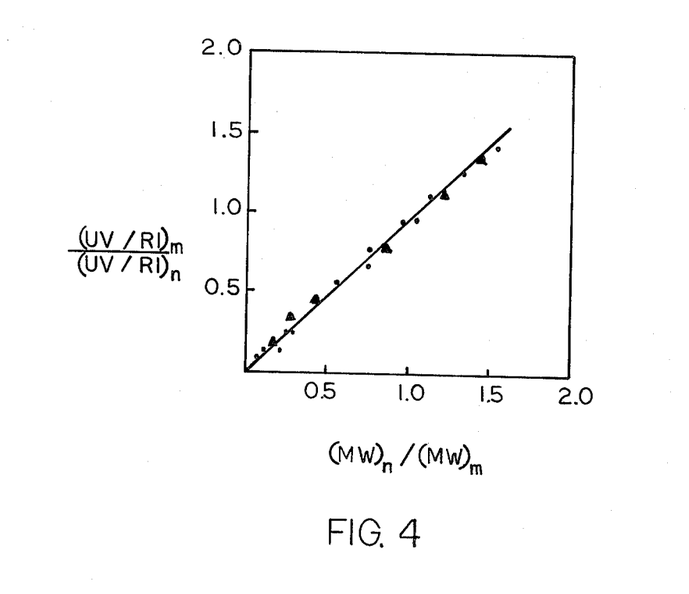
FIG. 4 is a diagnostic plot which shows that the number of phenyl nuclei remains the same in the species formed by plotting UV/RI ratios versus molecular weights for various compounds of the invention.

As shown in FIG. 4, the slopes of the linear (UV/RI)$_m$/(UV/RI)$_n$ versus (MW)$_n$/(MW)$_m$ plots for both Bisphenol and Trisphenol PIB's are within experimental error of unity indicating that the number of phenol termini remains the same in every molecular weight fraction across the entire sample. The Bisphenol compound is plotted with triangles while the Trisphenol with circles. The theory of these so called Kennedy- Smith plots is discussed in *J. Polym. Chem., Chem. Ed.*, 18, 1523 (1980).

Bisphenol and Trisphenol PIB may be converted quantitatively to the corresponding glycidyl ethers by reaction of the phenolic end group with epichlorohydrin:

where $R_1$ and $R_2$ may be the same or different and are selected from the group consisting of —H, —OH, and —CH$_3$ and n is 2 or 3. These structures contain stoichiometric quantities of terminal epoxy groups connected to phenolic moieties which in turn are connected to two or three saturated polyisobutylene elastomer segments. The actual epoxy functionality depends on whether $R_1$ and $R_2$ are hydroxyl.

These PIB containing di- and tri-epoxy prepolymers provide improved toughness, moisture resistance, and high temperature and oxidative resistance when compared to conventional resins made, for example of the diglycidyl ether of Bisphenol A(DGEBA).

In general, the epoxies have the formula:

where n is 2 or 3 and Z is defined as:

where $R_1$ and $R_2$ are defined above and n is from about 2 to about 700. As with the Bisphenol PIB's and Trisphenol PIB's described earlier, each Z moiety may have a different value of n resulting in different chain lengths on a single polymer molecule.

The epoxies can be amine cured using conventional amine curing agents such as triethylene tetramine, ethylene diamine or the like, in conventional amounts.

Epoxy resins prepared from DGEBA are rather brittle and are moisture sensitive due to their relatively low molecular weight rigid prepolymer and high polarity, respectively. The utilization of telechelic polyisobutylenes to incorporate rubbery segments into the epoxy resins greatly reduces the brittleness and also provides a significant nonpolar characteristic which decreases moisture sensitivity of the epoxy.

Example 2 illustrates the preparation of diglycidyl ethers of Bisphenol and Trisphenol PIB's using epichlorohydrin, while Example 3 gives representative curing experiments using triethylene tetramine. Table 2 summarizes the synthesis and characterization of glycidyl ethers of both Bisphenol and Trisphenol PIB's. The first line in Table 2 refers to results obtained with the model compound TMHPP. The phenol end group functionality ($\overline{F}_n^p$) was determined by UV spectroscopy whereas the epoxy functionality ($\overline{F}_n^e$) was determined by titration. Lines 2 and 3 show results obtained with the linear prepolymer Bisphenol PIB, and lines 3-6 refer to three-arm star Trisphenol PIB. Details of the UV method are as follows:

Known but different amounts of the model compound TMHPP were dissolved in the same amount of spectra quality cyclohexane and the absorbances of the above solutions were measured at 210 nm wave length using quartz cells of 1 cm path length. The calibration plot that was used to give the end group concentration was obtained by plotting the absorbances as a function of the concentration of TMHPP. A similar plot was obtained with polyisobutylene prepolymer.

A comparison of $\overline{F}_n^p$ and $\overline{F}_n^e$ reveals that both phenol and epoxy terminal functionalities are close to theoretical. The molecular weight increase from 1900 to 2500 in Line 2, Table 2, is beyond the experimental error of approximately 10% as measured by vapor pressure osmometry and may be due to adventitious —OH functions in the phenol-capped prepolymer which reacted with epoxy groups. The presence of —OH in the prepolymer was ascertained by $^1$H NMR spectroscopy (resonance at 3.67 ppm).

In Example 3, the glycidyl ether derivatives of Bisphenol and Trisphenol PIB's (Lines 3 and 4) were cured with equivalent amounts of triethylene tetramine (TETA) in the presence of approximately 10 mol. percent phenol at 40° C. under nitrogen atmosphere. Tough transparent slightly yellow flexible materials were obtained.

Figure 5:
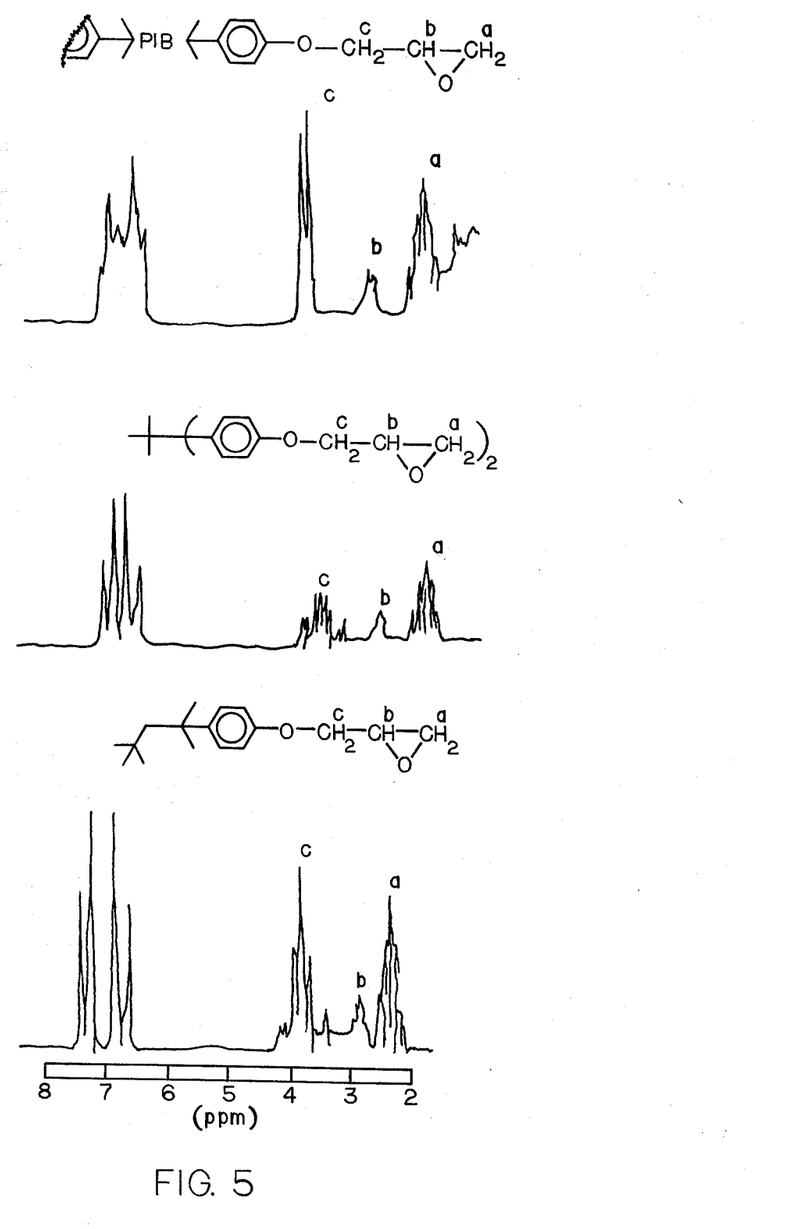
FIG. 5 shows NMR spectra of various glycidyl ethers of the invention.

FIG. 5 shows the $^1$H NMR spectra of the model glycidyl ether TMHPP, the diglycidyl ether of Bisphenol A and the triglycidyl ether of Trisphenol PIB. The key resonances (multiplets) of the model compound appear at 3.93, 3.13 and 2.60 ppm associated with the —O—C$\underline{H}_2$—, protons respectively. The resonances in Bisphenol A are shifted slightly toward lower fields (3.99, 3.23, and 2.70 ppm, respectively). The triglycidyl ether of Trisphenol PIB shows the multiplets at 3.13 and 2.66 ppm, characteristic of the methine and methylene protons of the epoxy ring.

Figure 6:
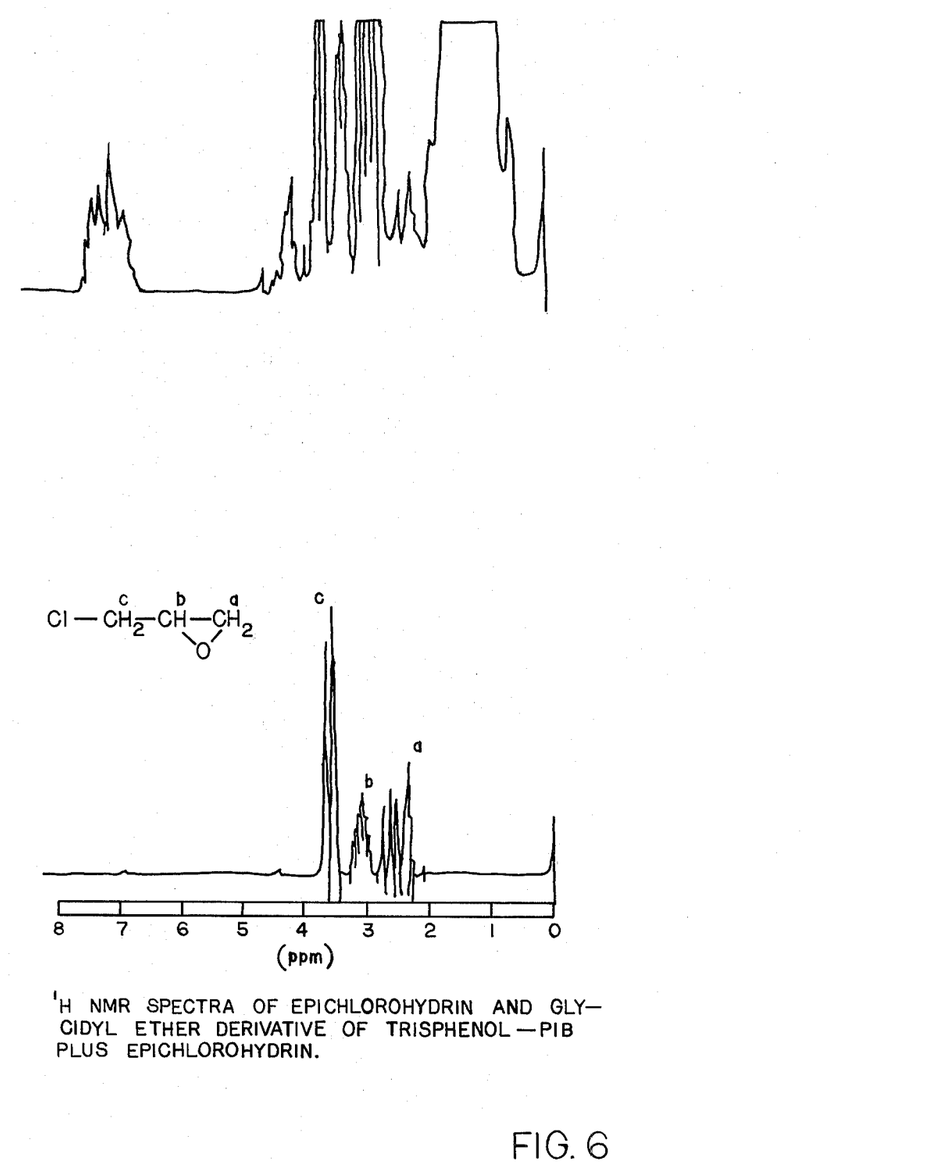
FIG. 6 shows still more NMR spectra of compounds of the invention.

The apparent doublet characteristic of —O— C$\underline{H}_2$- protons at 3.93 ppm is similar to that present in epichlorohydrin (3.53 ppm). That this doublet is established by mixing 10 weight percent epichlorohydrin to the triglycidyl ether of Trisphenol PIB. The spectrum of this mixture can be seen in FIG. 6 and exhibits all the characteristic resonances of epichlorohydrin and the triglycidyl ether derivative of PIB.

The epoxies produced by this invention have wide utility in a number of areas including adhesives, films, coatings, composite materials in conjunction with fiber glass, footwear, etc. Because of the excellent moisture resistance and flexibility, these epoxies can be used in areas heretofore restricted to elastomers while bringing with them the advantages of epoxies, such as general chemical resistance, and in some applications, room temperature cure. Typical examples include underwater paints, coatings subject to humid environments and wire insulation.

EXAMPLE 1

Materials and Instruments

Phenol (Mallinckrodt, analytical reagent) was sublimed before use. Boron trifluoride etherate (Eastman) was distilled under reduced pressure. Hexanes (Fisher, Reagent) were freed from olefinic impurities by treatment with fuming sulfuric acid. Cyclohexane and 2,4,4-trimethyl-1-penetene (TMP) were used as received. 2-chloro-2,4,6-trimethyl pentane (CTMP) was prepared by hydrochlorinating TMO in $CH_2Cl_2$ at approximately 5° C. The preparation and purification of telechelic polyisobutylenes with 2.0 or 3.0 tertiary chlorine end groups has been described by J. P. Kennedy and R. A. Smith [*J. Polymer Sci., Chem. Ed.,* 18, 1953 (1980)] and J. P. Kennedy; L. R. Ross; J. E. Lackey and O. Nuyken, *Polymer Bull.,* 4, 67 (1981), respectively, which is hereby incorporated by reference. Molecular weights were determined by a Knauer Vapor Pressure Osmometer using toluene at 40° C. Absorbances were measured by a Perkin Elmer 559 A UV/VIS Spectrometer. Proton NMR spectra were recorded by Varian T-60 Spectrometer. Gel permeation chromatography was carried out by a Waters High Pressure GPC instrument using a series of five micro styragel columns, model 6000 pump and RI/UV dual detectors. The calibration curve was prepared by well fractionated PIB samples.

EXPERIMENTAL

A representative experiment was performed as follows:

To a solution of phenol, 1 molar in hexanes, at 40°–45° C. stirred in a three neck flask fitted with condenser, pressure-equalized dropping funnels, magnetic stirrer and dry-nitrogen inlet/outlet, was added freshly distilled undiluted boron trifluoride etherate (0.07 mole). Subsequently olefin or tert.-chloride (0.2 molar in hexanes) was added dropwise. The olefins used were the model compound TMP, or the olefin telechelic PIB; the tert.-chlorides used were CTMP, or the tert.-chloride telechelic PIB. The olefin end group concentration of the olefin telechelic PIB was determined by $^1H$ NMR and it was assumed that the precursor, i.e., the tert.-chlorine telechelic PIB, contained the same concentration of end groups. After the addition was complete (8–10 hours) the temperature was raised to 50°–55° C. and stirring was continued for ~30 hours. It was observed that in the presence of more than 10% of the catalyst based on the total quantity of phenol, and at a relatively high temperature of ~60° C., cracking of TMP occurred and p-tert.-butyl phenol was obtained. The reactor was cooled to room temperature and the brown oily layer (if any) was removed. Approximately 200 ml water were slowly added and the content of the flask was transferred to a separatory funnel. The aqueous layer was removed and the organic layer washed 8–10 times with hot water (40°–50° C.) followed by washing with 50% aqueous solution of methanol. The methanol was removed by washing with cold water. Great care must be taken to remove even traces of free phenol. The presence of phenol in the washing water was monitored by its UV absorption. Washing was continued until the aqueous and the organic layer were free of phenol (GPC technique, UV detector). The organic layer was dried over anhydrous $Na_2SO_4$, the solvent then removed by rotary evaporation and the product was dried at 60° C. under vacuum.

An alternative procedure for the alkylation of phenol with either olefin or chlorine telechelic PIB is as follows:

Olefin or clorine telechelic PIB (39 g. $\overline{M}_n = 1800$) was dissolved in 300 ml olefin-free hexanes in a three neck flask fitted with condenser, mechanical stirrer and nitrogen inlet/outlet. To the above solution 16.3 g freshly distilled phenol were added followed by 100 ml dry methylene chloride. The flask was immersed in a constant temperature (41° C.) water bath. While stirring vigorously 10 ml $BF_3(C_2H_5)_2O$ were added. The reaction was carried on for about 50 hours after which methylene chloride was distilled off and approximately 200 ml water were added. The charge was stirred to bring the temperature up to a bath temperature. The mixture was transferred to a separatory funnel, the aqueous layer was removed and the organic layer was washed 8–10 times with aqueous methanol (50%) and finally with cold water to remove methanol. The organic layer was then dried over anhydrous $Na_2SO_4$ and the solvent was removed. The polymer was finally dried in a vacuum oven kept at 40° C.

Last traces of free phenol were efficiently removed from low molecular weight PIB's (mol. wt. ~2000) by sublimation under reduced pressure (~2 mm., 60° C.) or from high molecular weight PIB's (mol. wt. ~10,000) by repeated precipitation from acetone.

Specifically, the 2,4,4-trimethyl-2-(p-hydroxyphenyl)-pentane TMHPP model compound was prepared by alkylating phenol with either TMP or CTMP under mild conditions (see above) and recrystallizing the product three times from a n-hexane/methanol (95/5/v/v) mixture; Mp=71°–72° C. (p-tert.-butyl phenol Mp=96°–97° C.).

EXAMPLE 2

Materials and Instruments

Epichlorohydrin (Aldrich, 99+%), p-xylene (Aldrich, 99%) and benzyl trimethyl ammonium chloride (Alfa Products, 98%) were used as received. The preparation of 2,4,4-trimethyl-2-(p-hydroxyphenol)-pentane (TMHPP), bisphenol-polyisobutylene (BP-PIB) and trisphenol polyisobutylene (TP-PIB) have been described above.

$^1H$ NMR spectra were obtained by the use of a Varian T-60 spectrophotometer in $CCl_4$ using tetramethyl silane as internal standard. Molecular weights were determined by VPO using a Knauer Vapor Pressure Osmometer at 40° C. in toluene.

EXPERIMENTAL

To 1 mole of phenol-telechelic polyisobutylene (BP-PIB or TP-PIB) dissolved in p-xylene (b.p.: 138° C.)and stirred in a three-neck flask fitted with a magnetic stirrer, reflux condenser with drying tube, Dean-Stark trap, and pressure equalized dropping funnels, at 70°–80° C. were added 20 moles of epichlorohydrin. The solution was refluxed overnight and the water formed during the condensation was removed as azeotrope. The 0.12 mole benzyltrimethylammonium chloride phase transfer catalyst was added and thereafter the dropwise addition of a solution of 1.2 moles of NaOH in 100 ml water was commenced. The rate of NaOH addition was regulated to be equal to that of water removal.

Excess epichlorohydrin and p-xylene were removed under reduced pressure at 90° C. and the product was extracted with hexanes and washed several times with cold water to remove alkali, salt and benzyl trimethylammonium chloride. The solution was dried over anhydrous, Na₂SO₄, filtered and the solvent was removed by rotary evaporation. Finally the glycidyl ether derivative was dried at 80°–90° C. in a vacuum oven for 2 days.

Alternative procedure for reacting the Bisphenol PIB's with Epichlorohydrin:

Bisphenol PIB (21 g, Fn=2.01) were dissolved in 200 ml carbon tetrachloride in a 1 lit. flask fitted with mechanical stirrer, condenser and $N_2$ inlet/outlet. To this solution were added 5 ml epichlorohydrin and the solution brought to reflux temperature (77° C.). After refluxing for an hour 2 ml n-butanol, 15% aqueous solution of 0.5 g NaOH and 0.4 g tetrabutylammonium hydrogen sulfate were added. The mixture was vigorously stirred at the reflux temperature for 48 hours. Solvent and excess epichlorohydrin were removed by distillation under reduced pressure. The polymer was dissolved in hexanes, and washed repeatedly with water. The hexanes solution was dried over anhydrous Na₂SO₄. Solvent was removed and the polymer was dried in a vacuum oven kept at 60° C. The same procedure can also be carried out with trisphenol PIB.

EXAMPLE 3

To 3.25 g of DGE-TP-PIB ($M_n$=1500, see Line 4 in Table 2) dissolved in 3.26 g toluene were added 0.15 g triethylene tetramine and 0.06 g phenol. Dissolved air was removed using an aspirator and the liquid was poured in a Teflon mold. The mold was kept in a desiccator under nitrogen atmosphere at 40° C. for 5 days (purging with dry nitrogen from time to time). A transparent tough slightly yellow rubbery sheet was obtained.

To 5.1 g of DGE-BP-PIB ($M_n$=6300, see Line 3 in Table 2), dissolved in 5 g benzene were added 0.48 g triethylene tetramine and 0.016 g phenol. The same procedure as above (except 4 days and 40° C. and 3 days at 80° C.) gave a tough rubbery slightly yellow transparent sheet.

EXAMPLE 4

A DGE-PB-PIB sample of $M_n$=3800 was cured with TETA for 5 days at room temperature in a Teflon mold. The cured slightly yellow transparent nontacky sheet was rubbery in character. Microdumbbells where cut from the sheet and their modulus was determined by an Instron tester. Lap shear strength stress was measured using ASTM D-1002-76 giving a value of 50 kg/in.² Simultaneously the hydrolytic resistance of the samples was determined by ASTM D3137, i.e., microdumbbells were exposed to steam (85±5° C.) for 96 hours. The Young's moduli E of the test pieces before and after exposure to steam were $8.4 \times 10^5$ N/m² and $7.9 \times 10^5$ N/m² respectively. These results show that steam affects only very little if at all epoxy resins made of DGE-BP-PIB.

While the above examples and disclosure comply with the best mode requirements of the patent statutes, it is to be understood that the invention is not limited thereto or thereby. Reference should therefore be made to the following claims which define the scope of the invention.

TABLE I

Synthesis and Characterization of Bis - and Trisphenol PIB

| Starting Material | $\overline{M}_n$ | $\overline{F}_n$ | Product Phenol Functionality |
|---|---|---|---|
| (CH₃)₃CCH₂—C(CH₃)=CH₂ model cpd. | (112) | 1.00 | 1.00 |
| CH₂=(CH₃)CCH₂—PIB—CH₂C(CH₃)=CH₂ | 1900 | 2.01 | 2.08 |
| CH₂=(CH₃)CCH₂—PIB—CH₂C(CH₃)=CH₂ | 3000 | 1.98 | 1.93 |
| CH₂=(CH₃)CCH₂—PIB—CH₂C(CH₃)=CH₂ | 11000 | 1.94 | 1.90 |
| CH₂=(CH₃)CCH₂—PIB—CH₂C(CH₃)=CH₂ CH₂C(CH₃)=CH₂ | 6000 | 2.94 | 2.98 |
| (CH₃)₃CCH₂—C(CH₃)₂Cl | (147) | 1.00 | 1.00 |
| Cl'—PIB—Cl' | 1900 | 2.01 | 2.04 |
| Cl'—PIB—Cl' | 6300 | 1.97 | 2.12 |
| Cl'—PIB—Cl' Cl' | 1500 | 2.96 | 2.93 |
| Cl'—PIB—Cl' Cl' | 3500 | 2.90 | 2.91 |

TABLE 2

Synthesis and Characterization of Glycidyl Ethers of Bis - and Trisphenol PIB

| | Phenol-Capped PIB's | | Glycidyl Ether Derivatives | |
|---|---|---|---|---|
| | $\overline{M}_n$ | $\overline{F}_n^P$ | $\overline{M}_n$ | $\overline{F}_n^e$ |
| TMHPP (model) | (206) | 1.00 | (262) | 0.97 |
| linear | 1900 | 2.04 | 2500 | 1.94 |
| linear | 6300 | 2.12 | 6000 | 2.01 |
| tri-arm star | 1500 | 2.93 | 1530 | 2.96 |
| tri-arm star | 3500 | 2.91 | 3700 | 2.90 |
| tri-arm star | 6000 | 2.98 | 6400 | 2.92 |

$\overline{F}_n^P$ phenol functionality determined by UV spectroscopy
$\overline{F}_n^e$ epoxy functionality by titration

What is claimed is:

1. A telechelic prepolymer, comprising:

where n is 2 or 3 and Y is wherein R₁ and R₂ may be the same or different and are selected from the group consisting of —H, —OH, and —CH₃ and x is a positive integer.

2. A telechelic prepolymer according to claim 1, wherein x is from 2 to about 700 and the telechelic group is selected from the group consisting of resorcinol, phloroglucinol, 1,3-dimethyl-2-hydroxybenzene and phenol.

3. A telechelic prepolymer as in claim 2, wherein $R_1$ and $R_2$ are —H and x is about 30.

4. A telechelic prepolymer according to claim 3, wherein n is equal to 2.

5. A telechelic prepolymer according to claim 3, wherein n is equal to 3.

6. A telechelic epoxy prepolymer, comprising:

where n is 2 or 3 and Z is:

wherein $R_1$ and $R_2$ may be the same or different and are selected from the group consisting of —H, —OH, and —CH$_3$ and n is a positive integer.

7. A telechelic epoxy prepolymer according to claim 6 wherein x is between about 2 and 700 and $R_1$ and $R_2$ are —H.

8. A telechelic epoxy prepolymer according to claim 7, wherein prepolymer is cured with amine selected from the group consisting of ethylene diamine and triethylene tetramine.

9. A telechelic epoxy prepolymer according to claim 8, wherein said amine cured prepolymer is flexible and moisture resistant.

10. A telechelic epoxy prepolymer according to claim 9, wherein amine cured prepolymer is used as a coating.

* * * * *